United States Patent
Dholakia

(10) Patent No.: US 8,808,550 B2
(45) Date of Patent: Aug. 19, 2014

(54) APPARATUS AND METHOD FOR DISSOLUTION OF OZONE IN WATER AND CATALYTIC OXIDATION

(75) Inventor: Vipul P. Dholakia, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 150 days.

(21) Appl. No.: 12/726,702

(22) Filed: Mar. 18, 2010

(65) Prior Publication Data

US 2011/0226705 A1 Sep. 22, 2011

(51) Int. Cl.
*C02F 1/72* (2006.01)
*C02F 1/78* (2006.01)

(52) U.S. Cl.
USPC ........... 210/759; 210/760; 210/763; 210/151; 210/192

(58) Field of Classification Search
CPC .............. C02F 1/72; C02F 1/725; C02F 1/78; C02F 2305/023
USPC ......... 210/750, 752, 759, 760, 763, 765, 192, 210/194, 197, 205, 218, 510.1, 151; 422/211, 218, 222, 186.07
See application file for complete search history.

(56) References Cited

U.S. PATENT DOCUMENTS

| | | | | |
|---|---|---|---|---|
| 4,252,654 A | * | 2/1981 | Leitzke et al. | 210/760 |
| 4,255,257 A | * | 3/1981 | Greiner et al. | 210/709 |
| 5,114,576 A | * | 5/1992 | Ditzler et al. | 210/195.1 |
| 5,126,111 A | | 6/1992 | Al-Ekabi et al. | |
| 5,302,356 A | * | 4/1994 | Shadman et al. | 422/186.3 |
| 5,374,599 A | * | 12/1994 | Ishii et al. | 502/326 |
| 5,674,312 A | | 10/1997 | Mazzei | |
| 6,024,882 A | | 2/2000 | McNeilly et al. | |
| 6,284,705 B1 | | 9/2001 | Park et al. | |
| 6,730,214 B2 | | 5/2004 | Mazzie | |
| 7,109,378 B2 | | 9/2006 | Welp et al. | |
| 2003/0075513 A1 | | 4/2003 | Miller | |

FOREIGN PATENT DOCUMENTS

| | | |
|---|---|---|
| CN | 2692132 Y | 4/2005 |
| EP | 0 431 932 A1 | 6/1991 |
| EP | 0 625 482 A1 | 11/1994 |
| EP | 1 188 479 A1 | 3/2002 |
| EP | 1 234 802 A1 | 8/2002 |
| JP | 2002-320984 | 11/2002 |
| JP | 2003094076 | 4/2003 |
| KR | 2010-0003553 | 1/2010 |

(Continued)

OTHER PUBLICATIONS

Langlais et al; "Ozone in Water Treatment Application and Engineering" Cooperative Research Report; Lewis Publishers; p. 3838-405.

(Continued)

*Primary Examiner* — Lucas Stelling
(74) *Attorney, Agent, or Firm* — Willard Jones, II

(57) ABSTRACT

A system and method for oxidation treatment of water in which ozone gas is dissolved in water by passing a mixed gas-liquid stream through a monolith at an elevated pressure that is close to the preferred gas output pressure for an ozone generator. The monolith is preferably contained at least partially within a gas-liquid separator vessel. Advanced oxidation is optionally provided by injecting hydrogen peroxide and/or embedding a catalyst on the monolith. At least a portion of the treated water is preferably recycled in order to increase total ozone dosing in the effluent stream.

20 Claims, 2 Drawing Sheets

(56) References Cited

FOREIGN PATENT DOCUMENTS

| WO | 97/14657 | | 4/1997 |
|---|---|---|---|
| WO | 97/14657 | A1 | 4/1997 |
| WO | 03/028887 | A1 | 4/2003 |
| WO | 03/084652 | | 10/2003 |
| WO | 2008/030456 | A1 | 3/2008 |

OTHER PUBLICATIONS

Robert R. Broekhuis, Reinaldo M. Machado, Andrew F Nordquist, The Ejector-Driven Monolith Loop Reactor—Experiments and Modeling, Catalysis Today 69 (2001) 87-93, Elsevier Science B.V.

Sun, et al.; "Degradation of Nitrobenzen in Aqueous Solution by Modified Ceramic Honeycomb-Catalyzed Ozonation"; Environmental Science; vol. 26, No. 6; pp. 84-88.

* cited by examiner

APPARATUS AND METHOD FOR DISSOLUTION OF OZONE IN WATER AND CATALYTIC OXIDATION

BACKGROUND OF THE INVENTION

Ozone is a powerful disinfectant and is used to oxidize biodegradable organic contaminants from drinking water. It is useful in removing the taste and odor-causing compounds that are produced by blue-green algae in the surface water. Ozone is also used for tertiary treatment to remove the trace contaminants from filtered municipal waste water before reuse as indirect potable water or being discharged to environmentally sensitive regions. For the synthetic organic contaminants such as MTBE, TCE, 1,4 dioxane etc. typically found in chemical contaminated ground water sites, an advanced oxidation process is used.

Ozone can be used in combination with hydrogen peroxide and/or catalysts to produce hydroxyl radicals which oxidize the recalcitrant organic contaminants. Hydroxyl radicals are produced by the reaction between ozone and hydrogen peroxide or a catalyst in the aqueous phase. This type of treatment is referred to in the industry as an "advanced oxidation" process.

Ozone gas is commonly produced in a corona discharge-based generator from air or high purity oxygen. The typical concentration of ozone in gas phase ranges from 3 to 14%, depending on the generator power and concentration of oxygen in the gas feed used for ozone generation. Ozone-based water treatment processes depend upon transfer of ozone from the gas phase to the water phase for oxidation of organic contaminants. Various processes have been used to transfer ozone from gas phase to liquid phase for the purposes of water treatment.

One such known process is a bubble column or basin reactor, which comprises a large column or basin and gas diffusers located at the bottom of the column or basin. The column or basin is filled with water and ozone gas is introduced through the gas diffusers. Fine bubbles of ozone gas rise through the water in the column or basin, which promotes dissolution of the ozone into the water (also referred to herein as "ozone transfer"). Ozone transfer efficiency can be improved by capturing and recirculating undissolved ozone from the top of the column or basin and/or passing the ozone through a series of columns or basins using baffles. One problem with this dissolution method is that the diffusion pores of the gas diffuser typically clog over time, which adversely impacts performance. Another problem with a diffuser-based ozone transfer process is that large and deep basins are required for effective transfer of ozone to water. In addition, diffuser-based ozone transfer processes are relatively inefficient methods of ozone transfer.

Another known ozone transfer method is the use of a venturi ejector, in which water flows through the venturi and ozone gas is injected at the throat of the venturi. This venturi-based method can only be used in systems with relatively low water flow rates. In systems that operate at relatively large flow rates, a portion of the water can be diverted into a "slip stream" on which the venturi is located. The slip stream is then injected back into the main stream and mixed into the main stream by turbulent flow. The diverted stream venturi method is typically only effective for relatively low-dose ozone transfer (e.g., 10 mg/L or less).

In another variation of venturi-based ozone transfer, static mixers can be used downstream from the injector to achieve additional mixing of ozone in the water phase. The system is simpler to design as it has no moving parts. But the mixing and gas dispersion for good ozone transfer through a static mixer requires a highly turbulent flow of gas and liquid. This leads to a higher pressure drop and can only be operated in a narrow range of water and gas flow rates.

There have been attempts to perform ozone transfer using turbine contactors, which operate by aspirating gas through hollow turbine shafts and agitators. Turbine contactors do not appear to be well-suited to ozone transfer applications for several reasons. As compared to the ozone transfer methods described above, turbine contactors have relatively high power requirements. In addition, the ratio of ozone gas to water entering the turbine contactor must be kept relatively constant for efficient operation, which limits the ability to adjust ozone dosing. Turbine contactors are not well-suited for catalytic ozonation because the powdered catalyst will plug the channels through which the ozone gas is aspirated.

Packed columns are rarely used for ozone transfer because this type of reactor has very low ozone transfer efficiency, and therefore, a very tall column is required to achieve typical ozone dosing. Packed columns also have low void volume, which limits the water flow rate through a given diameter column. Packed columns can be used for fixed bed catalytic reactions with ozone but, due to low mass transfer efficiency of ozone, are expensive to build and operate.

Impinging jets have been used to enhance mixing between gas and liquid phases in ozone transfer systems. In such systems, a high-velocity jet of two phase flow is impacted with another jet or with a stationary surface. A portion of the water may be recycled through the jets. In addition, undissolved ozone may be captured downstream in a phase separator and recycled through the jets. Impinging jets can be used as the sole mixing reactor, or can be used in combination with other mixing reactors. The design and operation of an ozone transfer system including impinging jets is complex due to the need for precision location of the impact zones. In addition, the jets have relatively high power requirements and the rate of flow rates that can be accommodated by this type of system is limited.

Accordingly, there is a need for an improved method of ozone transfer that overcomes the deficiencies of the methods of the prior art.

BRIEF SUMMARY OF THE INVENTION

In one respect, the invention comprises a method for treating water, the method comprising introducing water into a pre-treatment stream, generating a gas stream containing at least 3% ozone gas, introducing the gas stream into the pre-treatment stream at an injection point resulting in a mixed-phase stream comprising ozone gas and water, passing the mixed-phase stream through a monolith located downstream from the injection point resulting in a reaction product in which at least a portion of the ozone gas is dissolved into the water, separating any undissolved ozone gas in the reaction product from a liquid-phase portion of the reaction product, and diverting at least a portion of the liquid-phase portion of the reaction product to an effluent stream.

In another respect, the invention comprises a water treatment system comprising a water supply line, an ozone generator for generating an output gas stream containing ozone, an ozone supply line that is configured to carry the output gas stream from the ozone generator and to connect to the water supply line at an injection point, a monolith having an outlet end and an inlet end that is downstream from the injection point and is in flow communication with the water supply line, a vessel that is in flow communication with the outlet end of the monolith, a gas purge line located on the vessel, a vessel output line located on the vessel for extracting liquid from the vessel, the vessel output line being positioned below the gas purge line, and an effluent port located on the vessel output line.

DETAILED DESCRIPTION OF THE EMBODIMENTS OF THE INVENTION

Unless otherwise stated herein, any and all percentages identified in the specification, drawings and claims should be understood to be on a weight percentage basis.

Unless otherwise stated herein, any and all pressures identified in the specification, drawings and claims should be understood to mean gauge pressure.

As used in the specification and claims, the term "flow communication" is intended to mean that two or more elements are connected (either directly or indirectly) in a manner that enables fluids to flow between the elements, including connections that may contain valves, gates or other devices that may selectively restrict fluid flow.

As used in the specification and claims, the terms "ozone transfer," "ozone mass transfer," and "ozone dissolution" are all intended to refer to the dissolution of ozone gas into water.

To aid in describing the invention, directional terms may be used in the specification and claims to describe portions of the present invention (e.g., upper, lower, left, right, etc.). These directional terms are merely intended to assist in describing and claiming the invention and are not intended to limit the invention in any way.

In the claims, letters are used to identify claimed steps (e.g. (a), (b), and (c)). These letters are used to aid in referring to the method steps and are not intended to indicate the order in which claimed steps are performed, unless and only to the extent that such order is specifically recited in the claims.

Figure 1:
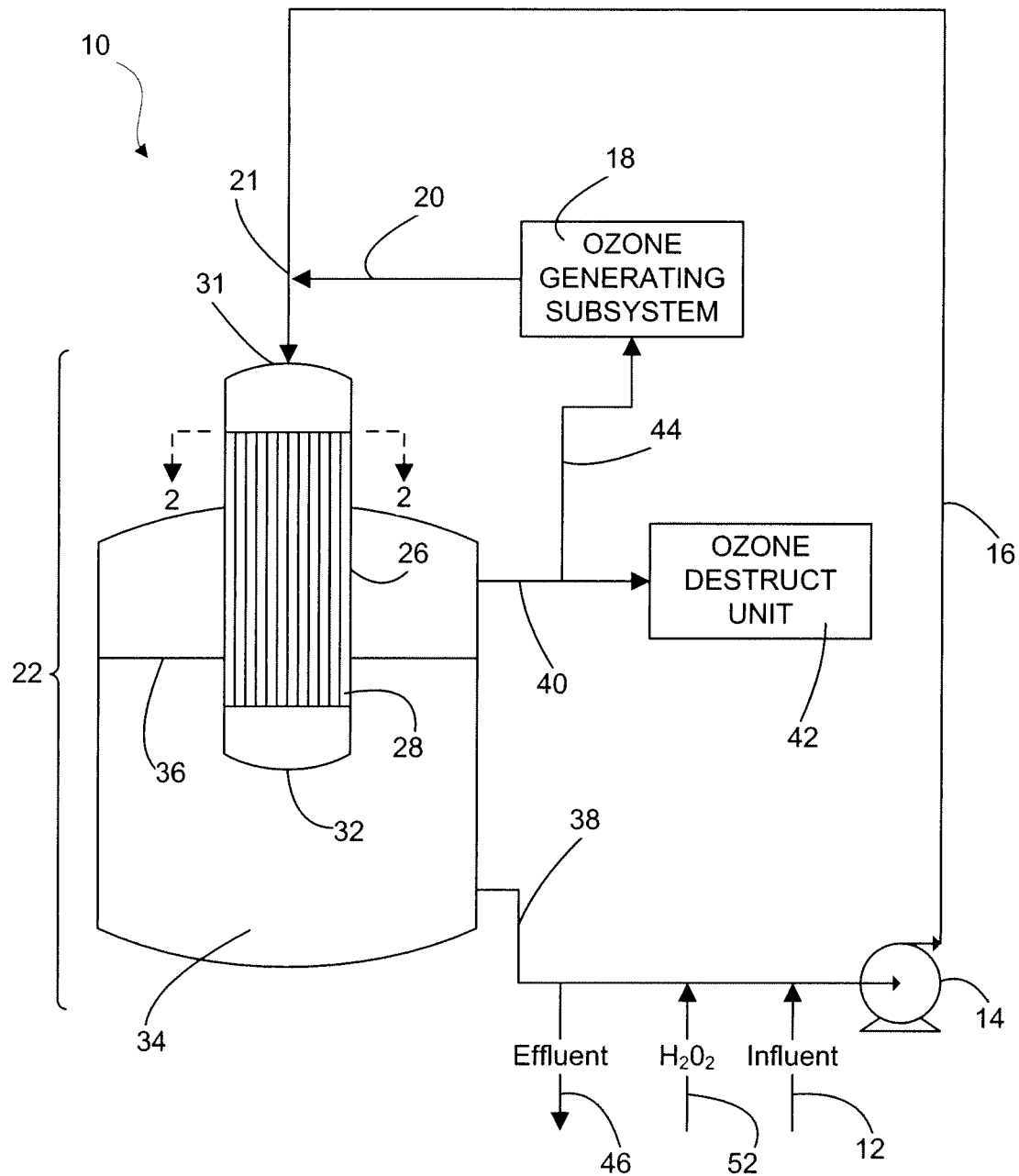
FIG. 1 is a schematic diagram of an exemplary embodiment of the present invention.

An exemplary water treatment system 10 is shown schematically in FIG. 1. In system 10, water to be treated is introduced into a pre-treatment line 16 by an influent feed stream 12. The pre-treatment line 16 includes a pump 14 which circulates water through the pre-treatment line 16. Ozone is generated by an ozone generating subsystem 18 and is introduced into the pre-treatment line 16 at a junction 21 by an ozone feed line 20, which is located just upstream from a mixing section 22. Introduction of the ozone gas into the pre-treatment line 16 can be accomplished using any suitable injector. For example, a gas nozzle, spray nozzle or venturi ejector could be used.

In this example, the ozone generating subsystem 18 comprises a corona discharge ozone generator. The ozone generator includes a feed line of either ambient air, oxygen enriched air or pure oxygen, depending upon the desired ozone concentration in the ozone feed line 20. In this example, a feed line comprising at least 90% oxygen is provided. A typical corona discharge ozone generator converts about 4 to 13% of the oxygen in the feed gas into ozone. Accordingly, the output gas stream from the ozone generating subsystem 18 will contain no less than 3% ozone under normal operating conditions. In other embodiments, any suitable alternative method of generating ozone could be used.

Figure 2:
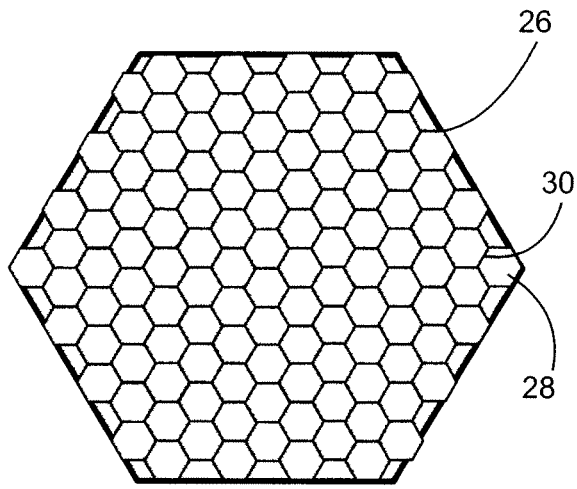
FIG. 2 is a partial sectional view taken along line 2-2 of FIG. 1.

A mixture of ozone gas (from the ozone feed line 20) and water from the pre-treatment line 16 then flows into the mixing section 22. In this example, the mixing section comprises a honeycomb monolith 26. Referring to FIGS. 1 and 2, the monolith 26 comprises a unitary structure having walls 30 that define parallel channels 28, which preferably fill the cross-sectional area of the monolith 26. In this example, the walls 30 are formed of a ceramic material. Cordierite, ceria-zirconia, alumina, carbon, and titanium dioxide are examples of other suitable substrate materials for the walls 30. Metals, such as stainless steel, would also be suitable substrate materials for the walls 30.

The walls 30 are preferably adapted to be impregnated with a catalyst for water treatment applications in which catalytic reactions are desired, such as catalytic oxidation of organic contaminants such as nitrobenzene, aniline dye wastewater, phenol, polyphenol, etc. Examples of common oxidation catalysts include carbon, palladium, iron, titania, copper, manganese, magnesium, ruthenium, and silver.

The gas-liquid mixture is preferably supplied to the monolith 26 at an elevated pressure (i.e., above atmospheric pressure), which increases ozone transfer efficiency. It is also preferable that the pressure in the pre-treatment line 16 be roughly equal to the pressure at which gas is supplied to the ozone feed line 20 by the ozone generator. The acceptable pressure difference between pre-treatment line 16 and ozone feed line 20 will depend upon the liquid velocity in pre-treatment line 16 and desired flow rate of ozone from the ozone feed line 20 into the pre-treatment line 16.

Most commercial ozone generators produce an output gas stream at a pressure of 15 to 30 pounds per square inch (103 to 207 kPa). Normal output gas stream pressures are lower for corona discharge ozone generators, where ozone generating efficiency begins to suffer if the output gas stream pressure exceeds 15 psi (103 kPa). In this example, the preferred pressure range for the pre-treatment line 16 is between 5 and 50 pounds per square inch (34 and 345 kPa). Obviously, the preferred range would change as ozone generators capable of operating at higher output gas stream pressures become commercially available.

In this example, both the overall cross-sectional shape of the monolith 26 and the channels 28 are hexagonal in shape. Many alternative shapes are possible and the monolith 26 and channels 28 need not be the same shape. For example, the overall cross-sectional shape of the monolith 26 could be circular and the channels 28 could be square. The preferred specifications for the monolith 26 in a specific application will depend upon a number of operating factors, including (but not limited to) the ranges of desired ozone and catalyst dosing, as well as the expected range of water flow rates. In this example, the velocity of water flowing through the monolith 26 is preferably in the range of 0.2 m/s to 1.0 m/s and, more preferably, in the range of 0.3 m/s to 0.6 m/s to reduce the pressure drop through the monolith 26 and achieve a desired level of ozone transfer efficiency.

The cross-sectional area of each channel and the total number of channels is preferably selected to provide a water flow velocity through the monolith 26 within the preferred ranges set forth in the previous paragraph. In many applications, it is preferable to provide a monolith 26 having parallel channels 28 having a density of between 100 and 1200 channels per square inch (15 and 186 channels per square centimeter) and, more preferably, between 200 and 600 channels per square inch (31 and 93 channels per square centimeter). Due to the narrow flow channels 28 of the monolith 26 mixing, the gas-liquid flow is laminar in nature. This reduces the pressure drop across the monolith 26 while still providing good gas-liquid contact due to circulating-motion of fluid inside the channels 28.

Optionally, the mixing section 22 could also include a static mixer (not shown), which could be located between the ozone feed line 20 in a ceramic honeycomb monolith 26 in order to provide more uniform distribution of ozone gas bubbles into the water prior to entering the monolith 26.

A discharge end 32 of the monolith 26 is preferably located within a gas-liquid phase separator vessel 34 and, more preferably, below or slightly above the water line 36 in the vessel 34. This design allows the mixing section 22 of the system 10 to be very compact with a small foot print. The downward flow of gas-water mixture exiting from the discharge end 32 of the monolith 26 will penetrate the water volume in the separator vessel 34 and create additional mixing and ozone transfer. Because the flow velocity at the discharge end 32 is relatively low and is generally laminar, the depth to which the gas bubbles penetrate below the water line 36 in the vessel 34 and fine bubble entrainment in the liquid phase will be reduced. This assists in an easy gas-liquid separation.

In this example, the system 10 is configured so the gas-liquid mixture flows downwardly through the monolith 26. In other embodiments, the monolith 26 could be oriented for upward or horizontal flow. It should be noted that upward and horizontal flow orientations are more practical in applications where ozone demand, and therefore the gas-liquid ratio of the mixture entering the monolith 26, is low. The length of monolith 26 can be selected to achieve a desired ozone mass transfer efficiency, with higher efficiency resulting from a longer monolith 26.

Gas that collects in the vessel 34 is vented to a gas purge line 40 that is preferably connected to an ozone destruct unit 42. The ozone destruct unit 42 converts any remaining ozone from the gas purge line 40 into oxygen and vents the oxygen gas to the atmosphere. Optionally, a gas recycle line 44 may recirculate gas from the vessel 34 to the ozone generating subsystem 18 (either upstream or downstream from the ozone generator).

Treated water is removed from the vessel 34 through an output line 38 located at the lower end of the vessel 34. In this example, the output line 38 is connected to the pump 14, which enables at least a portion of the treated water to be recirculated through the pre-treatment line 16. Water can be discharged from the system 10 through an effluent line 46.

A inlet port 52, which is connected to a supply of hydrogen peroxide, is preferably provided on the output line 38 to enable hydrogen peroxide to be added to the treatment process (referred to as advanced oxidation).

The system 10 can be adapted to provide a wide range of ozone dosing, i.e., the amount of ozone gas that is dissolved into the water during treatment. The system 10 is capable of supplying between about 2 and 125 mg of ozone per liter of water each time the water passes through the mixing section 22. If ozone dosing in excess of 125 mg/L is desired, the flow rates of the influent and effluent streams 12, 46 can be reduced, so that a larger fraction of the water in the output line 38 that is recycled through the pre-treatment line 16.

As used herein, "ozone dosing" is intended to refer to the amount of ozone that has been consumed by water each time it is cycled through the mixing section 22 and would typically be measured by comparing the ozone content of the ozone feed line 20 to the ozone content in the gas purge line 40. "Total average ozone dosing" is intended to refer to the total ozone dose in the treated water as it exits the system 10 through the effluent line 46. The relationship between "ozone dosing" and "total average ozone dose" is a function of the fraction of the water in the output line 38 is recycled through the pre-treatment line 16.

Figure 3:
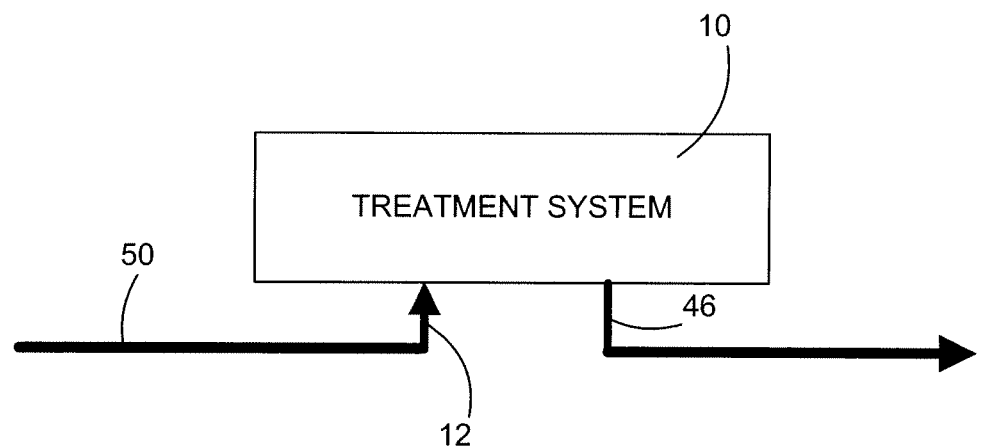
FIG. 3 is a schematic diagram showing an exemplary connection configuration for a water treatment system.
Figure 4:
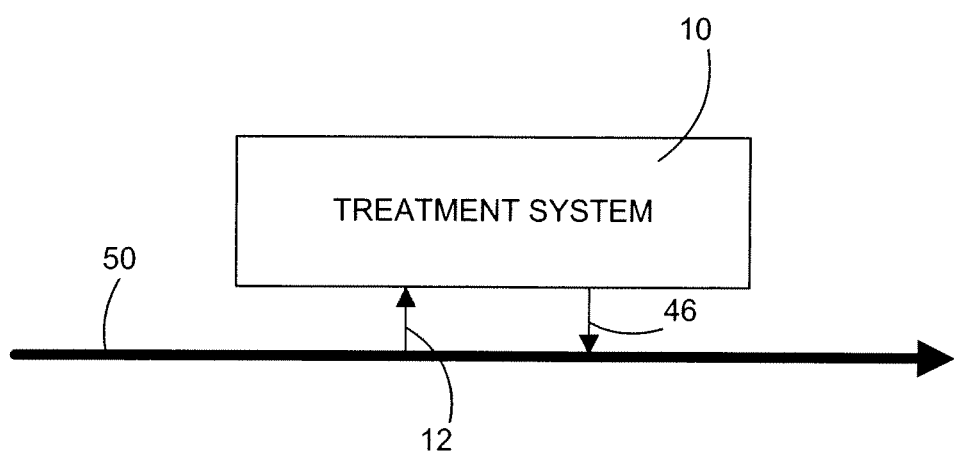
FIG. 4 is a schematic diagram showing a second exemplary connection configuration for a water treatment system.

FIG. 3 illustrates the configuration of the system 10 in which relatively high ozone dosing is desired. As shown in FIG. 3, the entire untreated water stream 50 is directed into the treatment system 10 by the influent stream 12. FIG. 4 illustrates a configuration of the system 10 in which relatively low ozone dosing is desired (e.g., 2-5 mg/L of water). In this configuration, only a portion of the water in the water line 50 is diverted into the treatment system 10 through the influent stream 12. Treated water is returned to the water stream 50 through the effluent stream 46, where it mixes with untreated water to provide a desired ozone dosing in the water stream 50. As shown in FIG. 4, the effluent line 46 preferably re-injects water into the water line 50 at a location that is downstream from the influent line 12.

The following are examplery operating parameters for the system 10.

EXAMPLE 1

In this example, a 10 gpm (37.9 L/min) wastewater stream containing aniline dye is to be treated with ozone and a copper, cobalt or nickel catalyst. The flow rate of the pretreatment stream 16 is 20 gpm (75.7 L/min) and the flow rates for the influent stream 12 and the effluent stream 16 are both 10 gpm. Ozone dosing at the junction 21 is 20 mg of ozone per liter of water in the pre-treatment line 16, resulting in an average total ozone dose of 40 mg/L for water exiting the system 10 at the effluent stream 16. The monolith 26 for this application is round, 3 inches (7.6 cm) in diameter, about 5 feet (152.4 cm) long, and has 200 cells per square inch (31.0 cells per square centimeter).

EXAMPLE 2

In this example, a 40 gpm (151.4 L/min) stream of industrial wastewater is treated using advanced oxidation to reduce its chemical oxygen demand ("COD") by approximately 30 mg/L. The flow rate of the pretreatment stream 16 is 100 gpm (378.5 L/min) and the flow rates for the influent stream 12 and the effluent stream 46 are both 40 gpm (151.4 L/min). Ozone dosing at the junction 21 is 60 mg of ozone per liter of water in the pre-treatment line 16, resulting in an average total ozone dose of 150 mg/L for water exiting the system 10 at the effluent stream 46. Hydrogen peroxide is introduced through inlet port 52 at a rate sufficient to provide approximately 40 mg of hydrogen peroxide per liter of water in the pre-treatment stream 16. The monolith 26 for this application is round, 6 inches (15.2 cm) in diameter, about 6 feet (183 cm) long and has 200 cells per square inch (31.0 cells per square centimeter).

As such, an invention has been disclosed in terms of preferred embodiments and alternate embodiments thereof. Of course, various changes, modifications, and alterations from the teachings of the present invention may be contemplated by those skilled in the art without departing from the intended spirit and scope thereof. It is intended that the present invention only be limited by the terms of the appended claims.

The invention claimed is:
1. A method for treating water, the method comprising:
 (a) introducing water into a pre-treatment stream;
 (b) generating a gas stream containing at least 3% ozone gas;

(c) introducing the gas stream into the pre-treatment stream at an injection point, resulting in a mixed-phase stream comprising ozone gas and water;

(d) passing the mixed-phase stream through a monolith having an inlet end and an outlet end and located downstream from the injection point, resulting in a reaction product;

(e) separating any undissolved gas in the reaction product from a liquid-phase portion of the reaction product; and (f) diverting at least a portion of the liquid-phase portion of the reaction product to an effluent stream;

wherein the monolith comprises a unitary structure having walls that define parallel channels within the monolith that fill a cross-sectional area of the monolith, wherein gas-liquid flow through the monolith is laminar in nature, and wherein the channels extend through the length of the monolith from the inlet end to the outlet end.

2. The method of claim 1, further comprising:

(g) recirculating at least part of the liquid-phase portion of the reaction product into the pre-treatment stream.

3. The method of claim 1, further comprising:

(h) recovering the reaction product from the monolith in a separator vessel; and (i) withdrawing the liquid phase portion of the reaction product from the separator vessel.

4. The method of claim 3, further comprising:

(j) maintaining a sufficient liquid-phase portion of the reaction product in the separator vessel to cover an outlet end of the monolith.

5. The method of claim 1, wherein step (d) further comprises passing the mixed-phase stream through the monolith at a liquid velocity that is between 0.2 m/s and 1.0 m/s.

6. The method of claim 1, wherein step (d) further comprises passing the mixed-phase stream through a monolith having between 100 and 1200 channels per square inch (15 and 186 channels per square centimeter).

7. The method of claim 1, further comprising:

(k) passing the mixed-phase stream through a static mixer upstream from the monolith and downstream from the injection point.

8. The method of claim 1, further comprising:

(l) injecting hydrogen peroxide into the water stream upstream from the monolith.

9. The method of claim 1, wherein step (d) comprises passing the mixed-phase stream through a monolith downstream from the injection point, the monolith having a catalyst impregnated thereon, resulting in at least a portion of the ozone gas being dissolved into the water and transfer of at least a portion of the dissolved ozone to the catalyst surface for reaction.

10. The method of claim 1, further comprising:

(m) diverting a portion of a water stream to form an influent stream;

(n) injecting the influent stream into the pre-treatment stream; and (o) injecting the effluent stream into the water stream downstream from the influent stream.

11. A water treatment system comprising:

a water supply line;

an ozone generator for generating an output gas stream containing ozone;

an ozone supply line that is configured to carry the output gas stream from the ozone generator and to connect to the water supply line at an injection point;

a monolith having an outlet end and an inlet end that is downstream from the injection point and is in flow communication with the water supply line;

a vessel that is in flow communication with the outlet end of the monolith;

a gas purge line located on the vessel;

a vessel output line located on the vessel for extracting liquid from the vessel, the vessel output line being positioned below the gas purge line; and an effluent port located on the vessel output line;

wherein the monolith comprises a unitary structure having walls that define parallel channels within the monolith that fill a cross-sectional area of the monolith, wherein gas-liquid flow through the monolith is laminar in nature, and wherein the channels extend through the length of the monolith from the inlet end to the outlet end.

12. The water treatment system of claim 11, wherein the outlet end of the monolith is positioned within the vessel.

13. The water treatment system of claim 11, further comprising a recycle line that is configured to return at least some of the liquid from the vessel output line to the water supply line.

14. The water treatment system of claim 11, wherein the monolith comprises a plurality of parallel channels.

15. The water treatment system of claim 14, wherein the plurality of parallel channels are arranged at a density of between 100 and 1200 channels per square inch (15 and 186 channels per square centimeter).

16. The water treatment system of claim 11, further comprising a pump in flow communication with the water supply line for providing a pressurized flow of water through the water supply line.

17. The water treatment system of claim 11, further comprising a hydrogen peroxide port that is in flow communication with the water line and is connected to a supply of hydrogen peroxide.

18. The water treatment system of claim 11, further comprising an ozone recycle line that is configured to divert at least a portion of the gas collected from the gas purge line to the ozone supply line.

19. The water treatment system of claim 11, wherein the monolith is impregnated with a catalyst.

20. The water treatment system of claim 19, wherein the catalyst is an oxidation catalyst.

* * * * *